United States Patent
Aoki et al.

(10) Patent No.: US 9,782,753 B2
(45) Date of Patent: Oct. 10, 2017

(54) CATALYTIC CONVERTER

(71) Applicant: TOYOTA JIDOSHA KABUSHIKI KAISHA, Toyota-shi, Aichi-ken (JP)

(72) Inventors: Yuki Aoki, Seto (JP); Hiromasa Suzuki, Toyota (JP); Hiroyuki Matsubara, Gifu (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 6 days.

(21) Appl. No.: 14/767,123

(22) PCT Filed: Dec. 19, 2013

(86) PCT No.: PCT/JP2013/084080
§ 371 (c)(1),
(2) Date: Aug. 11, 2015

(87) PCT Pub. No.: WO2014/125733
PCT Pub. Date: Aug. 21, 2014

(65) Prior Publication Data
US 2015/0375204 A1     Dec. 31, 2015

(30) Foreign Application Priority Data
Feb. 13, 2013   (JP) ................................. 2013-025580

(51) Int. Cl.
*B01J 23/46*     (2006.01)
*B01J 35/04*     (2006.01)
(Continued)

(52) U.S. Cl.
CPC ........ *B01J 23/464* (2013.01); *B01D 53/9413* (2013.01); *B01D 53/9422* (2013.01);
(Continued)

(58) Field of Classification Search
CPC ...... B01J 23/464; B01J 35/0006; B01J 23/40; B01J 23/63; B01J 35/04; B01J 35/023;
(Continued)

(56) References Cited

U.S. PATENT DOCUMENTS 5,538,697 A * 7/1996 Abe ..................... B01D 53/945
                                                         422/169
2002/0042344 A1   4/2002 Kondo et al.
(Continued)

FOREIGN PATENT DOCUMENTS

EP        1342889 A1    9/2003
JP      2002-177794 A   6/2002
(Continued)

*Primary Examiner* — Anthony J Zimmer
(74) *Attorney, Agent, or Firm* — Sughrue Mion, PLLC

(57) ABSTRACT

Provide is a catalytic converter including a substrate which includes regions having different cell densities, in which exhaust gas purification performance is superior in all the regions of the substrate.

A catalytic converter 10 includes catalyst layers in which a noble metal catalyst is supported on a support in surfaces of cell walls 2 of a substrate 1 having a cell structure in a longitudinal direction of the substrate 1 in which gas flows, in which the substrate 1 has a first region 1A having a relatively high cell density and a second region 1B having a relatively low cell density, and a ratio of a thickness of a catalyst layer 3A in the second region 1B to a thickness of a catalyst layer 3 in the first region 1A is in a range of more than 0.95 times and 1.2 times or less.

3 Claims, 4 Drawing Sheets

(51) Int. Cl.
*F01N 3/28* (2006.01)
*B01D 53/94* (2006.01)
*B01J 35/00* (2006.01)
*B01J 23/63* (2006.01)
*B01J 35/02* (2006.01)
*B01J 23/40* (2006.01)

(52) U.S. Cl.
CPC ............... *B01J 23/40* (2013.01); *B01J 23/63* (2013.01); *B01J 35/0006* (2013.01); *B01J 35/04* (2013.01); *F01N 3/2828* (2013.01); *B01D 2255/1021* (2013.01); *B01D 2255/1023* (2013.01); *B01D 2255/1025* (2013.01); *B01D 2255/9032* (2013.01); *B01D 2258/01* (2013.01); *B01J 35/023* (2013.01); *F01N 2330/06* (2013.01); *F01N 2330/48* (2013.01); *F01N 2330/60* (2013.01)

(58) Field of Classification Search
CPC ............ B01D 53/9413; B01D 53/9422; B01D 2255/1021; B01D 2255/9032; B01D 2255/1025; B01D 2255/1023; B01D 2258/01; F01N 3/2828; F01N 2330/06
See application file for complete search history.

(56) References Cited

U.S. PATENT DOCUMENTS

| | | | |
|---|---|---|---|
| 2007/0294989 A1* | 12/2007 | Ichikawa | B01D 46/247 55/523 |
| 2008/0004174 A1 | 1/2008 | Itoh et al. | |
| 2013/0121887 A1* | 5/2013 | Pimpalgaonkar | F01N 3/2892 422/176 |

FOREIGN PATENT DOCUMENTS

| | | |
|---|---|---|
| JP | 2007-330860 A | 12/2007 |
| JP | 2010-005590 A | 1/2010 |
| WO | 2010/001226 A1 | 1/2010 |

\* cited by examiner

CATALYTIC CONVERTER

TECHNICAL FIELD

The present invention relates to a catalytic converter that is accommodated and fixed in a pipe constituting an exhaust system for exhaust gas.

BACKGROUND ART

In various industries, various efforts to reduce environmental impacts have been made on a global scale. In particular, in the automobile industry, the development of techniques has progressed for the spread of not only a gasoline engine vehicle having superior fuel efficiency but also a so-called eco-car such as a hybrid vehicle or an electric vehicle and for further improvement in the performance of the vehicles.

Incidentally, in an exhaust system for exhaust gas that connects a vehicle engine and a muffler to each other, a catalytic converter for purifying exhaust gas is generally provided.

The engine may emit environmentally harmful materials such as CO, NOx, or unburned HC or VOC. In order to convert such harmful materials into environmentally acceptable materials, catalyst layers formed of a noble metal catalyst such as palladium or platinum are formed on cell wall surfaces of a substrate including plural cells. More specifically, on the cell wall surfaces of the plural cells, the catalyst layers are formed in a longitudinal direction of the substrate which is a direction in which exhaust gas flows. By causing exhaust gas to flow through the catalytic converter including the substrate having the above-described configuration, CO is converted into $CO_2$, $NO_x$ is converted into $N_2$ and $O_2$, and VOC is burned to produce $CO_2$ and $H_2O$.

However, for example, for a substrate including cells having a honeycomb structure, a catalytic converter having a uniform cell density of the substrate is generally used. However, since an exhaust gas flow rate distribution in a center region of a cross-section of the substrate is higher than that in a peripheral region thereof, there is a problem in that the catalyst layers of the entire substrate cannot be sufficiently utilized. Therefore, by using a catalytic converter in which a cell density of a center region of a substrate is higher than that of a peripheral region thereof in consideration of the above exhaust gas flow rate distribution, a difference between flow rate distributions in a cross-section of a substrate can be reduced as much as possible. Accordingly, catalyst layers of the entire catalytic converter can be efficiently utilized to purify exhaust gas.

Here, PTL1 discloses a technique of improving exhaust gas purification performance by causing the amount of a noble metal catalyst supported on a center region (here, middle portion) to be different from that supported on a peripheral region (here, peripheral portion), for example, in a substrate having a honeycomb structure in which the cell density is uniform in the entire catalytic converter (here, catalyst body). More specifically, in the catalyst body, the amount of catalyst per unit volume supported on the middle portion having a large amount of gas flow is set to be 1.1 times or higher than that on the peripheral portion.

By varying the cell density in a cross-section of a substrate as described above, pressure loss can be reduced, and exhaust gas purification performance can be improved.

However, when a catalytic converter having different cell densities in a cross-section of a substrate as described above is formed, the apparent catalyst coating amount may sometimes vary between a region having a high cell density and a region having a low cell density. This is because, even when the amounts of catalyst are the same, the thickness of a catalyst layer supported on one cell may vary. More specifically, this is because the region having a high cell density has a larger geometric surface area (GSA) of a honeycomb structure than that of the region having a low cell density and thus has a small thickness of a catalyst layer. At this time, in the region having a low cell density, the thickness of a catalyst layer is relatively large. In this case, the gas diffusibility to a deep portion of the catalyst layer deteriorates. Therefore, in the region having a low cell density, sufficient exhaust gas purification performance cannot be expected. This issue is not mentioned in the description of the catalytic converter disclosed in PTL 1 and cannot be solved by this catalytic converter.

CITATION LIST

Patent Literature

PTL 1: Japanese Patent Application Publication No. 2002-177794

SUMMARY OF THE INVENTION

The present invention has been made in consideration of the above-described problems, and an object thereof is to provide a catalytic converter including a substrate which includes regions having different cell densities, in which exhaust gas purification performance is superior in all the regions of the substrate.

In order to achieve the above-described object, according to an aspect of the invention, there is provided a catalytic converter including: catalyst layers in which a noble metal catalyst is supported on a support in cell wall surfaces of a substrate having a cell structure in a longitudinal direction of the substrate in which gas flows, in which the substrate has a first region having a relatively high cell density and a second region having a relatively low cell density, and a ratio of a thickness of a catalyst layer in the second region to a thickness of a catalyst layer in the first region is in a range of more than 0.95 times and 1.2 times or less.

In the catalytic converter according to the present invention, the ratio of the thickness of a catalyst layer in the second region having a relatively low cell density to the thickness of a catalyst layer in the first region having a relatively high cell density is adjusted to be in a range of more than 0.95 times and 1.2 times or less. As a result, in all the regions of the substrate of the catalytic converter, the exhaust gas diffusibility to a deep portion of a catalyst layer is improved, and exhaust gas purification performance is superior.

According to the verification of the present inventors, it was verified that the emission amount of exhaust gas can be reduced by using the catalytic converter having the above-described configuration.

Further, it was also verified that pressure loss can be reduced by using the catalytic converter having the above-described configuration.

In this way, by using the catalytic converter according to the present invention, a catalytic converter having low pressure loss and high exhaust gas purification performance can be realized.

In the catalytic converter according to the preferable embodiment of the invention, regions having different cell densities are formed in two regions including a center region and a peripheral region in a cross-section of a substrate perpendicular to a direction in which gas flows, the first region is the center region, and the second region is the peripheral region.

By setting the cell density of the center region to be relatively high, a difference in exhaust gas flow rate distribution between the center region and the peripheral region can be reduced as compared to a case of a substrate having a uniform cell density, and the entire catalyst constituting the catalytic converter can be efficiently utilized to purify exhaust gas.

Here, as the substrate having a cell structure, not only a ceramic material such as cordierite or silicon carbide which is formed of a composite oxide of magnesium oxide, aluminum oxide, and silicon dioxide; but also a material other than a ceramic material, such as a metal material may be used. In addition, in this configuration, a so-called honeycomb structure including cells having plural lattice contours which have, for example, rectangular, hexagonal, and octagonal shapes can be adopted.

In addition, examples of a support constituting the catalyst layers that are formed on the cell wall surfaces of the substrate include oxides containing at least one porous oxide of $CeO_2$, $ZrO_2$, and $Al_2O_3$ as a major component; one oxide among ceria ($CeO_2$), zirconia ($ZrO_2$), and alumina ($Al_2O_3$); and a composite oxide formed of two or more oxides among ceria ($CeO_2$), zirconia ($ZrO_2$), and alumina ($Al_2O_3$) (for example, a $CeO_2$—$ZrO_2$ compound which is a CZ material, or an $Al_2O_3$—$CeO_2$—$ZrO_2$ ternary composite oxide (ACZ material) into which $Al_2O_3$ is introduced as a diffusion barrier). One kind or two or more kinds of noble metal catalysts such as rhodium, palladium, and platinum are supported on the above supports to form catalyst layers.

The catalytic converter according to the present invention preferably has a cordierite honeycomb support having superior thermal shock resistance but may be an electrically heated catalytic converter (EHC: Electrically Heated Converter). In the electrically heated catalytic converter, for example, a pair of electrodes is attached to a honeycomb catalyst, the honeycomb catalyst is heated by causing a current to flow through the electrodes, and the activity of the honeycomb catalyst is improved so as to detoxify the exhaust gas passing therethrough. By applying this electrically heated catalytic converter to an exhaust system for exhaust gas that connects a vehicle engine and a muffler to each other, exhaust gas can be purified not only at room temperature but also at a cold temperature by activating the catalyst due to electric heating.

As can be seen from the above description, in the catalytic converter according to the present invention, the substrate as a component thereof has a first region having a relatively high cell density and a second region having a relatively low cell density, and a ratio of a thickness of a catalyst layer in the second region to a thickness of a catalyst layer in the first region is in a range of more than 0.95 times and 1.2 times or less. As a result, the catalytic converter which is superior in exhaust gas purification performance can be provided.

MODES FOR CARRYING OUT THE INVENTION

Hereinafter, an embodiment of a catalytic converter according to the present invention will be described with reference to the drawings.

(Exhaust System for Exhaust Gas)

First, an exhaust system for exhaust gas in which the catalytic converter according to the present invention is provided will be briefly described. In the exhaust system for exhaust gas to which the catalytic converter according to the present invention is applied, an engine, a catalytic converter, a three-way catalytic converter, a sub muffler, and a main muffler are disposed and connected to each other through a system pipe, and exhaust gas produced from the engine flows to each unit through the system pipe and is exhausted. Next, hereinafter, the embodiment of the catalytic converter will be described.

(Embodiment of Catalytic Converter)

Figure 1:
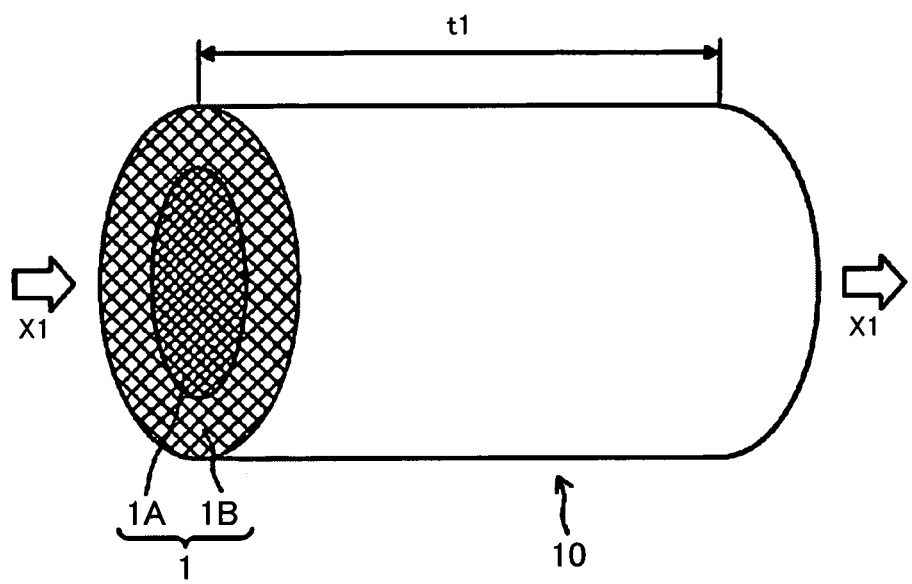
FIG. 1 is a schematic diagram showing an embodiment of a catalytic converter according to the present invention.

FIG. 1 is a schematic diagram showing an embodiment of the catalytic converter according to the present invention. FIG. 2(a) is an enlarged view showing cell wall surfaces of a first region (center region) of a substrate, and FIG. 2(b) is an enlarged view showing cell wall surfaces of a second region (peripheral region) of the substrate. In addition, FIG. 3 is a graph showing the exhaust gas flow rate distributions of a substrate having a uniform cell density and the substrate having different cell densities between the center region and the peripheral region.

Briefly, a catalytic converter 10 shown in FIG. 1 includes: a cylindrical substrate 1 having plural cells; and catalyst layers 3 that are formed on surfaces of cell walls 2 constituting the cells.

Here, examples of a material of the substrate 1 include a ceramic material such as cordierite or silicon carbide which is formed of a composite oxide of magnesium oxide, aluminum oxide, and silicon dioxide; and a material other than a ceramic material such as a metal material. In addition, examples of a support constituting the catalyst layers that are formed on the cell wall surfaces of the substrate include oxides containing at least one porous oxide of $CeO_2$, $ZrO_2$, and $Al_2O_3$ as a major component; one oxide among ceria ($CeO_2$), zirconia ($ZrO_2$), and alumina ($Al_2O_3$); and a composite oxide formed of two or more oxides among ceria ($CeO_2$), zirconia ($ZrO_2$), and alumina ($Al_2O_3$) (for example, a $CeO_2$—$ZrO_2$ compound which is a CZ material, or an $Al_2O_3$—$CeO_2$—$ZrO_2$ ternary composite oxide (ACZ material) into which $Al_2O_3$ is introduced as a diffusion barrier). One kind or two or more kinds of noble metal catalysts such as Pd, Pt, and Rh are supported on the above supports to form all the catalyst layers 3.

The substrate 1 has a honeycomb structure including cells having plural lattice contours which have, for example, rectangular, hexagonal, and octagonal shapes, and exhaust gas flows through the inside of each cell (X1 direction).

The substrate 1 has two regions including: a first region 1A (center region) having a relatively high cell density; and a second region 1B (peripheral region) having a relatively low cell density.

Here, the exhaust gas flow rate distributions will be described with reference to FIG. 3. In the flow rate distributions of FIG. 3, two end points of a diameter centering on the center 0 of a cross-sectional circle of the substrate are set as −1 and 1, and intermediate positions therebetween are shown as ratios with respect to a radius. The exhaust gas flow rate at each position is shown as a ratio with respect to the flow rate at the center of a substrate of a catalytic converter having a uniform cell density of the substrate.

In the catalytic converter having a uniform cell density of the substrate, as indicated by a dotted line in FIG. 3, the exhaust gas flow rate distribution of the center region of a cross-section of the substrate is significantly higher than that of the peripheral region thereof. Therefore, there is a problem in that it is difficult to sufficiently utilize the catalyst layers of the entire substrate. On the other hand, as in the catalytic converter 10 according to the present invention, by forming the substrate 1 using the two regions having different cell densities and setting the cell density of the peripheral region 1B to be relatively low, as indicated by a solid line in the same drawing, a difference in flow rate distribution between the center region 1A and the peripheral region 1B of the substrate 1 can be significantly reduced, and all the catalyst layers included in the catalytic converter 10 can be efficiently utilized to purify exhaust gas.

Further, in the catalytic converter 10 shown in the drawings, the thickness of the catalyst layer formed on the cell wall surface of each region varies between the first region 1A and the second region 1B of the substrate 1.

Figure 2:
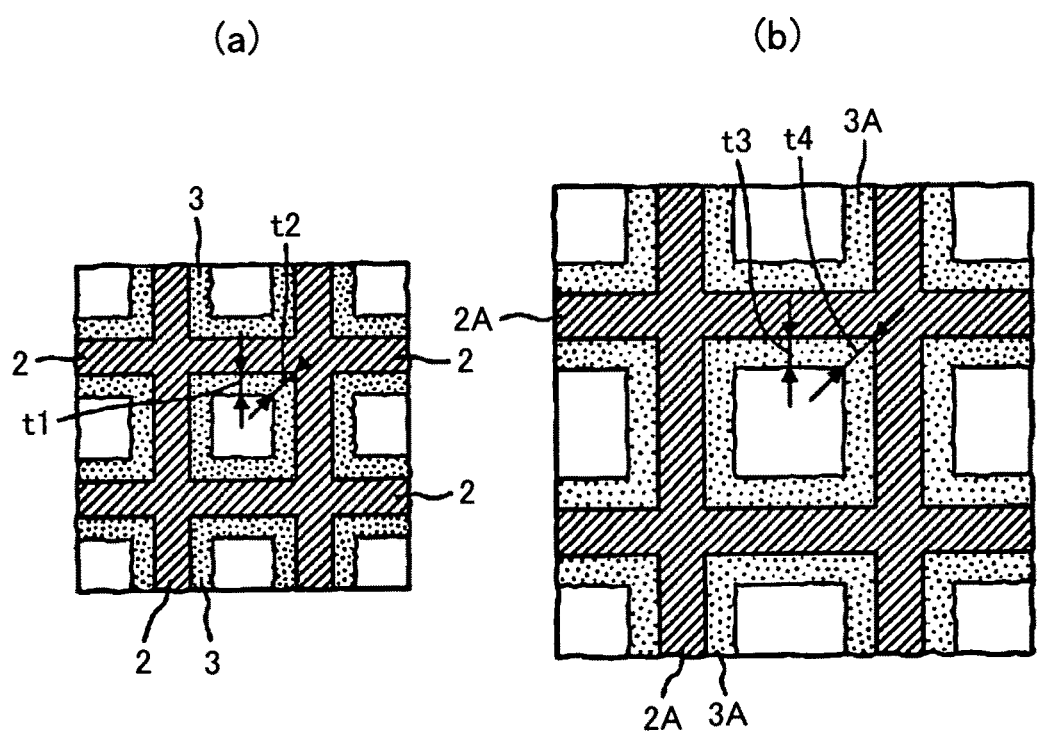
FIG. 2(a) is an enlarged view showing cell wall surfaces of a first region (center region) of a substrate.
FIG. 2(b) is an enlarged view showing cell wall surfaces of a second region (peripheral region) of the substrate.
Figure 3:
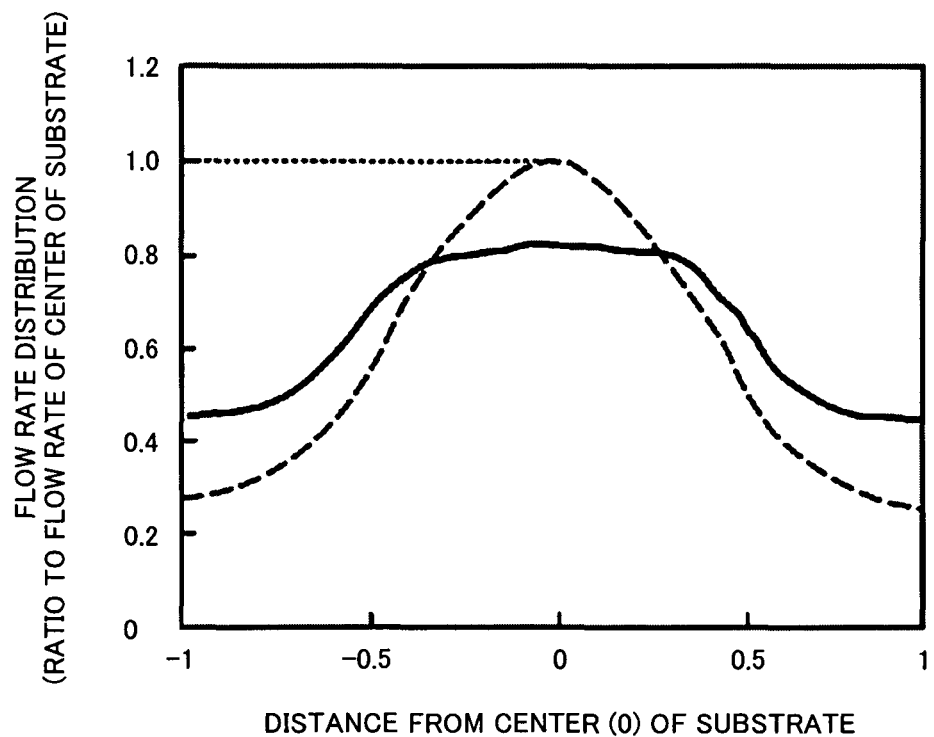
FIG. 3 is a graph showing the exhaust gas flow rate distributions of a substrate having a uniform cell density and the substrate having different cell densities between the center region and the peripheral region.

Specifically, a ratio of the thickness of a catalyst layer 3A (refer to FIG. 2(B)) in the second region 1B having a relatively low cell density to the thickness of a catalyst layer 3 (refer to FIG. 2($a$)) in the first region 1A having a relatively high cell density is adjusted to be in a range of more than 0.95 times and 1.2 times or less.

Here, in a method of calculating the thickness of each catalyst layer, in FIG. 2($a$), the thicknesses t1 of four sides (general portions) of the catalyst layer 3 are measured, and the thicknesses t2 of four corner portions of the catalyst layer 3 are measured. Next, an average value obtained by dividing the sum of the eight thicknesses by 8 is set as the thickness of the catalyst layer 3 in the first region 1A. On the other hand, in FIG. 2($b$), the thicknesses t3 of four sides (general portions) of the catalyst layer 3A are measured, and the thicknesses t4 of four corner portions of the catalyst layer 3A are measured. Next, an average value obtained by dividing the sum of the eight thicknesses by 8 is set as the thickness of the catalyst layer 3A in the second region 1B. Although not shown in the drawings, in a case where a cell has a hexagonal shape, an average value obtained by dividing the sum of the values of measuring the thicknesses of six sides and the values of measuring the thicknesses of six corner portions by 12 can be set as the thickness of a catalyst layer in a target region.

According to the present inventors, it was verified that, by setting the ratio of the thickness of the catalyst layer 3A to the thickness of the catalyst layer 3 to be in a range of more than 0.95 times and 1.2 times or less, a catalytic converter can be obtained in which the exhaust gas diffusibility to a deep portion of the catalyst layer is improved in all the regions of the substrate, exhaust gas purification performance is superior, and pressure loss is relatively low. The reason for low pressure loss is that the thickness of the catalyst layer in the second region is relatively small.

[Experiment of Measuring Emission and Pressure Loss of Catalytic Converters, and Results Thereof]

The present inventors prepared each catalytic converter of Examples 1 and 2 Comparative Examples 1 to 6 shown below, and the emission amount of exhaust gas and the amount of pressure loss of each catalytic converter were measured. Regarding emission, ratios of values of other catalytic converters to a value of the catalytic converter of Comparative Example 1 were obtained. Regarding pressure loss, ratios of values of other catalytic converters to a value of the catalytic converter of Comparative Example 2 were obtained. Based on the ratios, a graph is created. Hereinafter, the specification of the substrate of each catalytic converter, the specification of the catalyst layers thereof, and the summary of a durability evaluation test method will be described.

(Regarding Honeycomb-Structured Substrate)

<Honeycomb Structure 1>

A honeycomb-structured substrate formed of cordierite was prepared by extrusion, and a difference in cell density was generated between the center region and the peripheral region. Regarding the size of the honeycomb structure, the diameter of a circular cross-section perpendicular to a flowing direction of exhaust gas was ϕ103 mm, and the length L thereof in a longitudinal direction thereof was 105 mm. The cell density of a peripheral region having a relatively low cell density was 400 cpsi (62 cells/cm$^2$), the cell density of a center region having a relatively high cell density was 600 cpsi (93 cells/cm$^2$), a switch line between the center region and the peripheral region was at a position of ϕ70 mm, and the lattice shape of the cells was rectangular in both of the two regions.

<Honeycomb Structure 2>

A honeycomb-structured substrate formed of cordierite was prepared by extrusion, and the cell density was uniform. Regarding the size of the honeycomb structure, the diameter of a circular cross-section perpendicular to a flowing direction of exhaust gas was ϕ103 mm, and the length L thereof in a longitudinal direction thereof was 105 mm. The cell density was 600 cpsi (93 cells/cm$^2$), and the lattice shape of the cells was rectangular.

<Amount of Catalyst Layer (Coating Amount)>

Regarding the center regions of the honeycomb structure 2 and the honeycomb structure 1, the amount of a catalyst layer was 250 g/L. Regarding the peripheral region of the honeycomb structure 1, the amount of a catalyst layer varied between Examples and Comparative Examples.

<Amount of PGM>

The amount of Pt was 1.0 g/L, and the amount of Rh was 0.3 g/L.

(Regarding Durability Test Method)

Each catalytic converter was mounted on an exhaust system of a V-type 8-cylinder 4.3 liter gasoline engine, and a durability test was performed at a catalyst bed temperature of 1000° C. for 50 hours under conditions where the engine underwent feedback, fuel cut, rich, and lean states for one minute.

(Regarding Pressure Loss Evaluation)

When air flows to the catalytic converter at 6 m$^3$/min, the pressure loss (converted to a value at 25° C.) was measured and was evaluated based a ratio of the measured value to the value of Comparative Example 2.

(Regarding Emission Evaluation)

Figure 4:
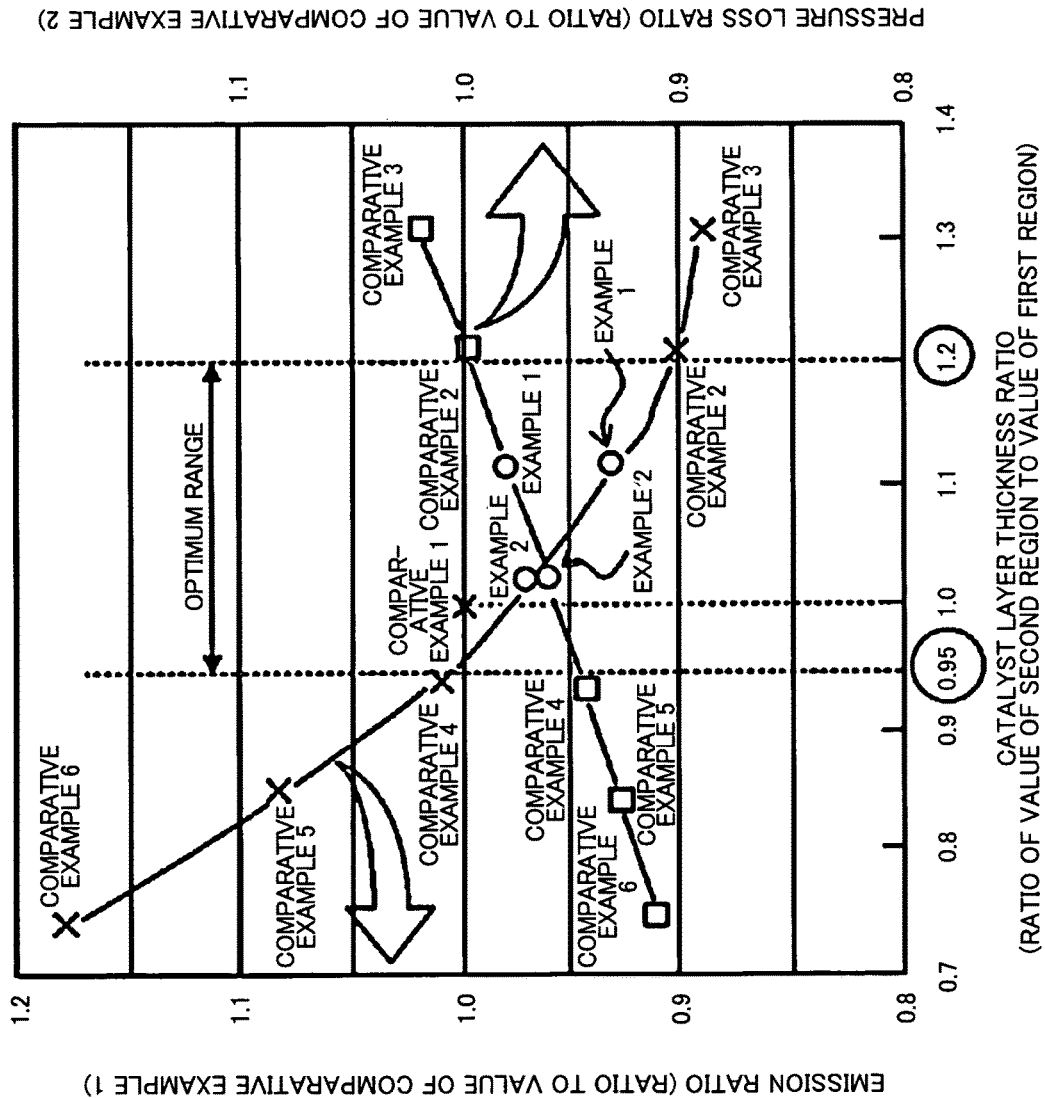
FIG. 4 is a graph showing the experiment results of measuring emission and pressure loss of catalytic converters.

Each catalytic converter was set in an actual engine. The emission amount of NOx was measured while switching an A/F ratio between a rich state (14.1) and a lean state (15.1) every second, and was evaluated based on a ratio of the measured value to the value of Comparative Example 1. Hereinafter, Table 1 and FIG. 4 show the experiment results regarding the level, the pressure loss ratio, and the emission ratio of each catalytic converter.

TABLE 1

| | Example 1 | Example 2 | Comparative Example 1 | Comparative Example 2 | Comparative Example 3 | Comparative Example 4 | Comparative Example 5 | Comparative Example 6 |
|---|---|---|---|---|---|---|---|---|
| Honeycomb Structure | Honeycomb Structure 1 | Honeycomb Structure 1 | Honeycomb Structure 2 | Honeycomb Structure 1 | Honeycomb Structure 1 | Honeycomb Structure 1 | Honeycomb Structure 1 | Honeycomb Structure 1 |
| Catalyst Layer Thickness Ratio | 1.12 | 1.02 | 1 | 1.21 | 1.31 | 0.93 | 0.84 | 0.75 |
| Amount (g/L) of Catalyst Layer in First Region | 250 | 250 | 250 | 250 | 250 | 250 | 250 | 250 |
| Amount (g/L) of Catalyst Layer in Second Region | 230 | 330 | 250 | 250 | 270 | 190 | 170 | 150 |
| Pressure Loss Ratio | 0.98 | 0.96 | 1.20 | 1 | 1.02 | 0.95 | 0.94 | 0.93 |
| Emission Ratio | 0.93 | 0.97 | 1 | 0.91 | 0.89 | 1.01 | 1.08 | 1.17 |

In Examples 1 and 2 in which the catalyst layer thickness ratios were 1.12 and 1.02, respectively, the pressure loss ratios and the emission ratios were less than 1.

From FIG. 4 based on the above experiment results, the ratio of the thickness of a catalyst layer in the second region having a relatively low cell density to the thickness of a catalyst layer in the first region having a relatively high cell density can be defined to be in a range of more than 0.95 times and 1.2 times or less.

Hereinabove, the embodiments of the present invention have been described with reference to the drawings. However, a specific configuration is not limited to the embodiments, and design changes and the like which are made within a range not departing from the scope of the invention are included in the present invention.

REFERENCE SIGNS LIST

1 . . . SUBSTRATE, 1A . . . FIRST REGION (CENTER REGION), 1B . . . SECOND REGION (PERIPHERAL REGION), 2, 2A . . . CELL WALL, 3, 3A . . . CATALYST LAYER, 10 . . . CATALYTIC CONVERTER

The invention claimed is:

1. A catalytic converter comprising:
a substrate having a cell structure in which gas flows; and
catalyst layers that contain a noble metal catalyst supported on a support and that are formed on surfaces of cell walls of the substrate along a longitudinal direction of the substrate,
wherein the substrate has a first region and a second region, the second region having a cell density lower than a cell density of the first region,
the catalyst layers include a first catalyst layer provided in the first region and a second catalyst layer provided in the second region, and
a ratio of a thickness of the second catalyst layer to a thickness of the first catalyst layer is 1.02 or more and 1.12 or less.

2. The catalytic converter according to claim 1, wherein the first region is a center region in a cross-section of the substrate, the cross-section being perpendicular to a direction in which the gas flows, and
the second region is a peripheral region in the cross-section of the substrate.

3. The catalytic converter according to claim 1, wherein a pressure loss ratio of the catalytic converter is 1 or less and an emission ratio of the catalytic converter is 1 or less.

* * * * *